June 21, 1960

W. H. HUGGINS 2,942,248

APPARATUS AND METHOD FOR DETECTING ABRUPT
CHANGES IN DIELECTRIC SHEET MATERIAL

Filed Aug. 8, 1956

United States Patent Office 2,942,248
Patented June 21, 1960

2,942,248

APPARATUS AND METHOD FOR DETECTING ABRUPT CHANGES IN DIELECTRIC SHEET MATERIAL

William H. Huggins, Clinton, Conn., assignor, by mesne assignments, to Curtiss-Wright Corporation, a corporation of Delaware Filed Aug. 8, 1956, Ser. No. 602,690

12 Claims. (Cl. 340—259)

This invention relates to apparatus and a method for detecting abrupt changes in the condition of rapidly advancing sheet material of a dielectric type, and particularly for detecting bumps, creases, folds, and sudden thickness increases in such materials, for example, paper or plastic, or textiles.

An object of the invention is to provide apparatus and a method for detecting, in such material, abrupt bumps greater than a selected magnitude, while ignoring smaller ones and ignoring unchanging or very slowly changing properties of the material as it advances past the station where the bumps are detected. The apparatus of the present invention provides a "size-control" by which the operator may select the size bumps to be detected. The apparatus will detect only bumps equal to or greater than that size.

Another object of the invention is to provide apparatus and a method for detecting bumps in advancing dielectric sheet material, while ignoring conducing particles in the same.

In one of its embodiments, the invention includes a pair of opposed sensing electrodes for yieldably engaging opposite surfaces of a rapidly-advancing sheet of dielectric material, these electrodes being connected in a series circuit with a resistance and a source of D.-C. voltage. One of these electrodes may comprise one or more skids for yieldably engaging the material. A bump in the material passing between the electrodes produces a transient voltage variation between the electrodes. This voltage variation, which may be in the nature of a voltage pulse, is applied, through a blocking condenser, to the first of a series of A.-C. coupled amplifiers. One of the series of amplifiers for example, the second, may include means for applying a negative biasing voltage to its grid, so as to bias it to an "off" or non-conducting condition. The output of the second amplifier is applied to a third amplifier which controls a relay, which in turn controls an indicating device such as an an audible or visible alarm, and, if desired, also a recording device. A significantly large, abrupt change in the material rapidly advancing between the sensing electrodes turns on the biased-off amplifier and actuates the alarm and recording device.

Adjustment of the bias referred to above provides a coarse size-control, and adjustment of the gain of the preceding amplifier stage provides a fine or vernier size control, to determine the size bumps to be detected.

It will be noted that, in this embodiment, the sensing circuit and its energizing means are D.-C. in nature, but the amplifiers, and the coupling between them and the sensing electrodes, are A.-C. in nature. The system is extremely responsive to bumps, but is, as desired, capable of ignoring other quantities, such as the absolute thickness of the material, moisture changes in the dielectric material and in the atmosphere, and certain spurious signals resulting from minute non-uniformities in the material and other causes.

For the purpose of making certain that conducting particles in the material do not produce spurious responses, the apparatus may in certain embodiments include, in combination with the bump detector circuit, a particle detector circuit and associated control elements, connected to be responsive to the presence of conducting particles between the sensing electrodes and to prevent the spurious actuation of said indicating device even when such particles actuate the bump detector circuit itself.

These and other features and objects obtainable by the practice of the present invention will be readily understood by persons skilled in the art by reference to the following detailed description taken in connection with the drawings, which describe and illustrate the invention in certain of its embodiments.

Figure 1:
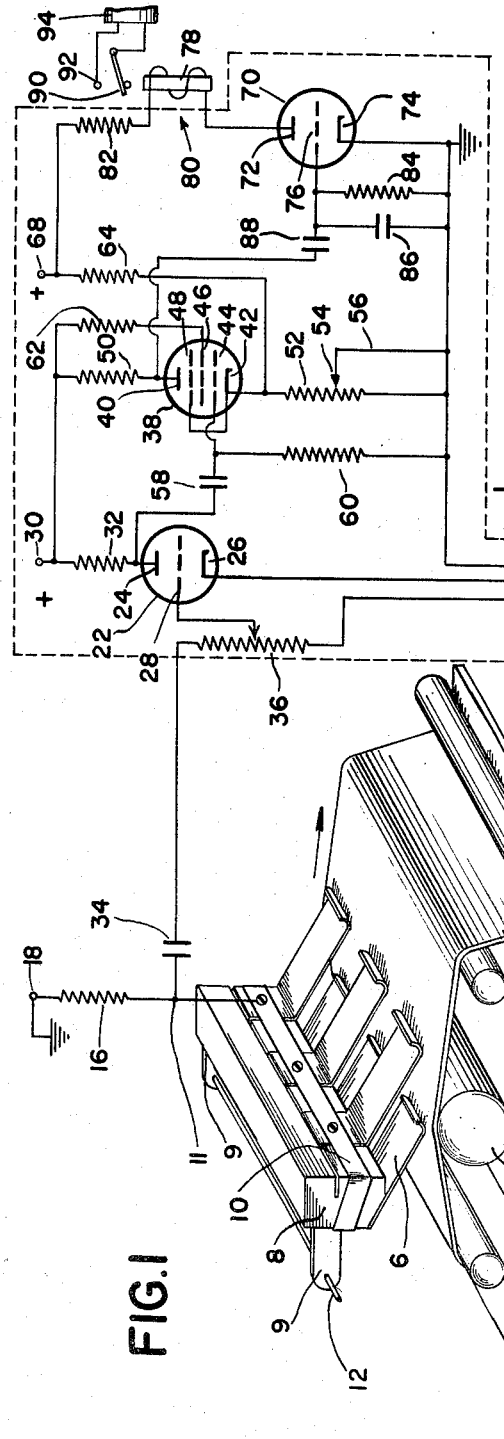
Figure 1 is a schematic circuit diagram of a bump detector.

Reference is now made to Figure 1. There is shown a backing electrode 4 and an opposed sensing electrode 6 which may take the form of an array of skids. The backing electrode is shown as a roller, and this has advantages from the mechanical standpoint; however, the backing electrode may take the form of a flat plate over which the material slides.

Figure 2:
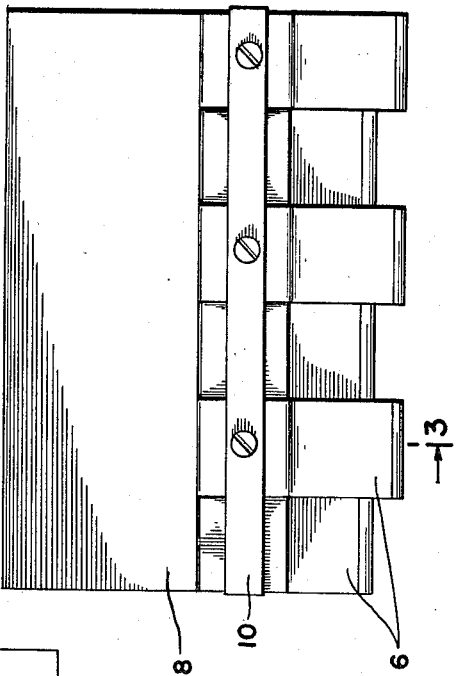
Figure 2 is a side elevational view of one form of the skid-type sensing electrodes which may be used in Figure 1.
Figure 3:
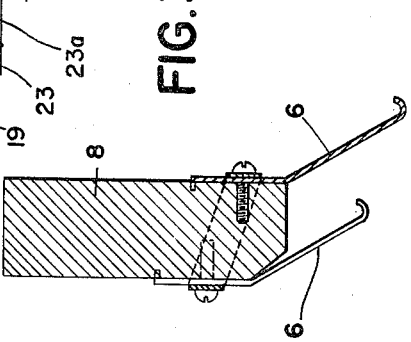
Figure 3 is a vertical sectional view of the skid-type sensing electrodes shown in Figure 2.

As to the upper electrode, the skids, as shown in Figures 2 and 3, are mounted, by screws, on an insulating supporting block 8 and are electrically connected together by a metal strap 10. The block 8 is supported by brackets 9, which in turn are carried on a shaft 12. The skid assembly may be rotated clockwise into its normal material-engaging position, or counter-clockwise into a lifted position. The skid electrodes are normally yieldably urged toward the roller electrode 4 so as individually to engage areas of the surface of rapidly advancing dielectric sheet material 14, and press it against the roller 4. This material may for example, comprise paper, or a plastic material, such as vinyl plastic.

As may be seen from the drawings, several of the skids may be spaced transversely across the width of the sheet, with alternate skids carried on opposite sides of the supporting block 8. The arrangement is such that the skids on one side of the block more than cover the spaces between the skids on the opposite side. That is, they overlap slightly, so that areas of the sheet passing beneath the electrode assembly must be sensed by at least one of the skids.

In an illustrative form, the individual skids may be, for example, full-hard, stainless steel, of the order of 0.008 to 0.020 inch thick. In the arrangement shown in the drawing, there are six skids carried on one supporting block. In some cases, where the material is wide, several such skid arrays may be spaced across the width of the sheet, all skids being opposed to a single roller 4. Each skid array may have its own output circuit channel, or a plurality of skids may be connected to one circuit channel.

In different arrangements, the width of the skid may vary considerably. In one arrangement which has been found quite satisfactory for certain applications, each skid is carried on an individual supporting block. All the skids may be mounted so that they are all in alignment across the dielectric sheet, instead of being staggered as shown in Figure 1. With paper 54 inches wide, there may, for example, be employed 11 blocks. The seven blocks toward the center may each carry a skid six inches wide. Toward each edge there may be employed a pair of blocks, each carrying a skid three inches wide. The total of seven six-inch skids and four three-inch skids cover the total 54-inch width of the paper. If narrower paper is to be used, the two outer skids may be readily lifted up. Three circuit channels may be employed to monitor the output from these skids.

The optimum number of skids per channel, and the width of the skids, will be determined to a large extent by the dielectric constant, thickness, and average moisture content of the material.

In still another arrangement, instead of using skid electrodes 6, small metal rolls may be used, opposed to the backing roller 4. The factors referred to above which determine the width of the skid electrodes would determine the width of the roller electrodes.

The electrodes 4 and 6 are connected in series with a resistor 16 and a source of D.-C. voltage, which may be derived by rectifying and filtering a voltage from an A.-C. supply. The upper end of the resistor 16 is connected to a grounded terminal 18. There is provided a D.-C. voltage source 19, across which there is connected a potentiometer or voltage divider 23 having an adjustable slider 23a. The lower end of this potentiometer, and the lower, negative, side of the voltage source 19 are connected to a terminal 20. The terminal 20 is connected to the terminal 18 through the common ground. The adjustable slider 23a is connected to the terminal 17, which in turn is connected, through a small metallic brush electrode 21, to the roller electrode 4.

Across the terminals 17 and 20 is connected a condenser 25, which tends to stabilize somewhat the voltage across these terminals.

In one illustrative arrangement, the voltage source 19 may be about 600 volts, with the slider 23a adjusted to tap off, say, 300 volts between it and the terminal 20. A convenient illustrative potentiometer 23, in such an arrangement, might have a total resistance of about 1 megohm.

It may therefore be seen that, in series with the electrode 4, the material 14, the electrode 6, and the resistor 16, there is connected an adjustable D.-C. voltage source, the positive terminal of which is connected to the electrode 4.

There is provided a first amplifier or repeater comprising a vacuum tube 22 having an anode 24, a cathode 26 and a control grid 28. The cathode is connected to the grounded, negative terminal of a D.-C. voltage source, the positive terminal of which is connected to a terminal 30. A resistor 32 is connected between the positive terminal 30 and the anode 24.

The skid electrode 6 is coupled by a condenser 34 and a potentiometer 36 to the control grid 28. One end of the potentiometer 36 is grounded. Its slider is connected to the grid 28.

In this arrangement, the vacuum tube 22 is normally in a conducting condition, because its grid 28 is normally at a potential above the cut-off potential. It will be noted from the circuit that this grid 28 is biased approximately to ground or cathode potential.

It will also be noted that the potentiometer 36, by variation of its slider, provides a gain control. Variation of the slider controls the portion of the signal which reaches the grid 28.

There is also provided a second amplifier, normally biased off, comprising in this illustrated arrangement a pentode vacuum tube 38 having an anode 40, a cathode 42, a control grid 44, a screen grid 46 and a suppressor grid 48. The anode 40 is supplied with a positive D.-C. voltage through an anode resistor 50. The cathode 42 is connected through a resistor 52 to the negative or grounded terminal of the D.-C. power supply. Associated with this resistor is a slider or variable tap 54 and a lead 56 arranged to short-circuit a variable amount of the resistor 52. The anode 24 of the tube 22 is coupled by a blocking condenser 58 to the control grid 44. This grid is connected by a resistor 60 to ground. The screen grid 46 is supplied with a positive voltage through a screen resistor 62. The suppressor grid 48 is connected to the cathode.

The cathode 42 is also connected by a resistor 64 to a positive terminal 68. It may be seen that the potential of the cathode 42 will be determined, in large part, by the voltage divider action provided by the resistor 64 and the effective upper portion of the resistor 52 above the short-circuiting variable tap 54, in connection with the positive voltage at the terminal 68. The cathode 42 will therefore always be maintained at a positive voltage with respect to ground. Since the grid 44, because of the connection through the resistor 60, is approximately at ground potential, and in view of the relative circuit constants associated with the voltage divider mentioned, the relative potentials of the cathode 42 and the grid 44 are such that the tube 38 is normally biased off. This tube therefore does not conduct except when a sufficiently positive voltage variation is applied to its grid to overcome the bias which normally maintains it in a cut-off condition. Adjustment of the variable tap 54 adjusts the bias, and determines how large a positive pulse on the grid 44 is required to cause the tube 38 to conduct.

There is also provided an output amplifier comprising a vacuum tube 70, having an anode 72, a cathode 74, and a control grid 76. The cathode 74 is grounded. The anode 72 is connected through a winding 78 of a relay 80 and through a resistor 82 to the positive terminal 68 of the D.-C. voltage supply.

The grid 76 is connected to ground through a resistor 84. Connected in parallel with this resistor is a condenser 86. The anode 40 of the tube 38 is coupled by a blocking condenser 88 to the grid 76.

The tube 70 normally conducts heavily, in the absence of a bump between the electrodes 4 and 6.

The relay 80 includes an armature 90, spring-biased up, toward a contact 92. When the winding 78 is energized, as it normally is, it holds the armature 90 down. When the winding is de-energized, the spring pulls the armature 90 up against the contact 92. The armature 90 and the contact 92 are connected to output means 94 schematically representing an indicator device together with means for energizing it when the armature 90 engages the contact 92. The output means 94 may comprise a recording voltmeter, a light, horn, bell, drive-control, or other visible recording, alarm or control apparatus, together with an energizing source for the same.

The dielectric sheet material 14 advances rapidly between the electrodes 4 and 6. Because the material is of the dielectric type, and because the applied voltage from the terminals 18 and 20 is D.-C. in nature, the effective impedance between the electrodes 4 and 6 is very high. There will, however, necessarily be a very small amount of current leakage through the sheet material from one electrode to the other. In addition, as the dielectric material advances between the electrodes, a small charging current will flow through the circuit including these electrodes. Because of these two effects there will consequently be a small current flowing through the resistor 16. Minor variations in the sheet material will cause minor variations in this current and hence in the voltage appearing across the points 11 and 20. It is desired that the system ignore such minor variations, and it does.

Because of the blocking effect of the condenser 34, steady D.-C. voltages appearing across the points 11 and 20 are, to a large extent, discriminated against and prevented from reaching the grid 28.

When a bump in the sheet material passes between a skid electrode 6 and the roller electrode 4, the skid is temporarily caused to be separated from the roller electrode to a greater extent. The result is that a bump causes a negative pulse to be applied to the grid 28. The bump causes this negative pulse by a combination of effects. The chief one is that the electrode 6 being separated from the electrode 4 by a greater thickness of dielectric material produces a major discontinuity of the average charging current. In addition, bumps which are small in area, although perhaps pronounced in height, markedly increase the effective resistance between the electrodes 4 and 6, because the area of contact with the electrode 6 is smaller in the presence of a bump than in the absence of one.

Because of all the combined causes, the effect of a bump is to cause an abrupt change in the impedance conditions within the circuit in which the skid electrodes are connected, and consequently a negative pulse is applied, through the condenser 34, to the grid 28.

The negative pulses applied to the grid 28 are amplified in the tube 22 and applied as positive pulses onto the grid 44 of the tube 38. Extremely large negative pulses may cut off the tube 22, but negative pulses of intermediate size are amplified without cutting off this tube. The operation of the bump detector does not necessarily depend upon the cutting off of the tube 22.

The anode current of the tube 38 is normally cut off because the cathode is biased to a sufficiently higher potential than the control grid 44, so as to produce this effect. The slider 54 is adjusted so that only bumps larger than a predetermined size will be detected. Bumps larger than the predetermined size will produce positive pulses on the grid 44 of great enough magnitude to turn the tube 38 on temporarily, for the duration of the bump. This causes a negative pulse to be applied to the grid 76 of the tube 70. The tube 70 is normally in a heavily conducting condition so as to hold the armature 90 down, away from the contact 92, toward which it is spring biased. Pulses caused by bumps larger than the predetermined size will produce on the grid 76 of the tube 70 a negative pulse of great enough magnitude to cut off this tube, thereby causing the relay 80 to release the armature 90. The armature 90 then engages the contact 92 and causes the indicator 94 to be actuated.

Even in the absence of large bumps, as the material 14 advances rapidly between the electrodes 4 and 6, there will be, as has been explained, low-level spurious voltage variations between these electrodes, which should not be detected. A feature of the apparatus is that it may be adjusted to actuate the indicator for variations in the material greater than a predetermined amount, but will ignore variations less than that amount. Adjustment of the position of the slider 54 produces this adjustable effect in the apparatus. More particularly, moving the slider 54 down, away from the cathode, serves to short out a smaller amount of the resistor 92. This raises the cathode potential and increases the size bump required to cause the apparatus to respond.

A characteristic of the apparatus is that, by using a D.-C., resistance-type, sensing circuit, followed by an A.-C. coupled amplifying circuit, great sensitivity to bumps is obtained, and undesired steady or slowly changing effects are discriminated against.

An additional feature of the operation of the resistor 16 is that it prevents "pitting" of the eletrodes. Also, by providing a high-impedance supply to the electrodes, it substantially eliminates the shock hazard.

The condenser 86 has the effect of lengthening pulses applied to the grid 76, because of its ability to hold a charge. Some pulses from the tube 38 would be of such short duration that they could not cause the relay 80 to become de-energized. The condenser 86 lengthens them enough to release this relay, as desired.

As previously mentioned, there may be employed, for the backing electrode, either a roller electrode 4, as illustrated, or a flat-plate-type electrode. In case a flat plate is employed, it should be opposed to all the skid electrodes 6, so that these skid electrodes press the sheet material against the flat plate electrode.

Paper and other dielectric sheet material sometimes includes electrically-conducting particles. In order to make certain that such particles do not cause the bump detector to actuate the indicator the combined apparatus shown in Figure 4 may be employed.

Figure 4:
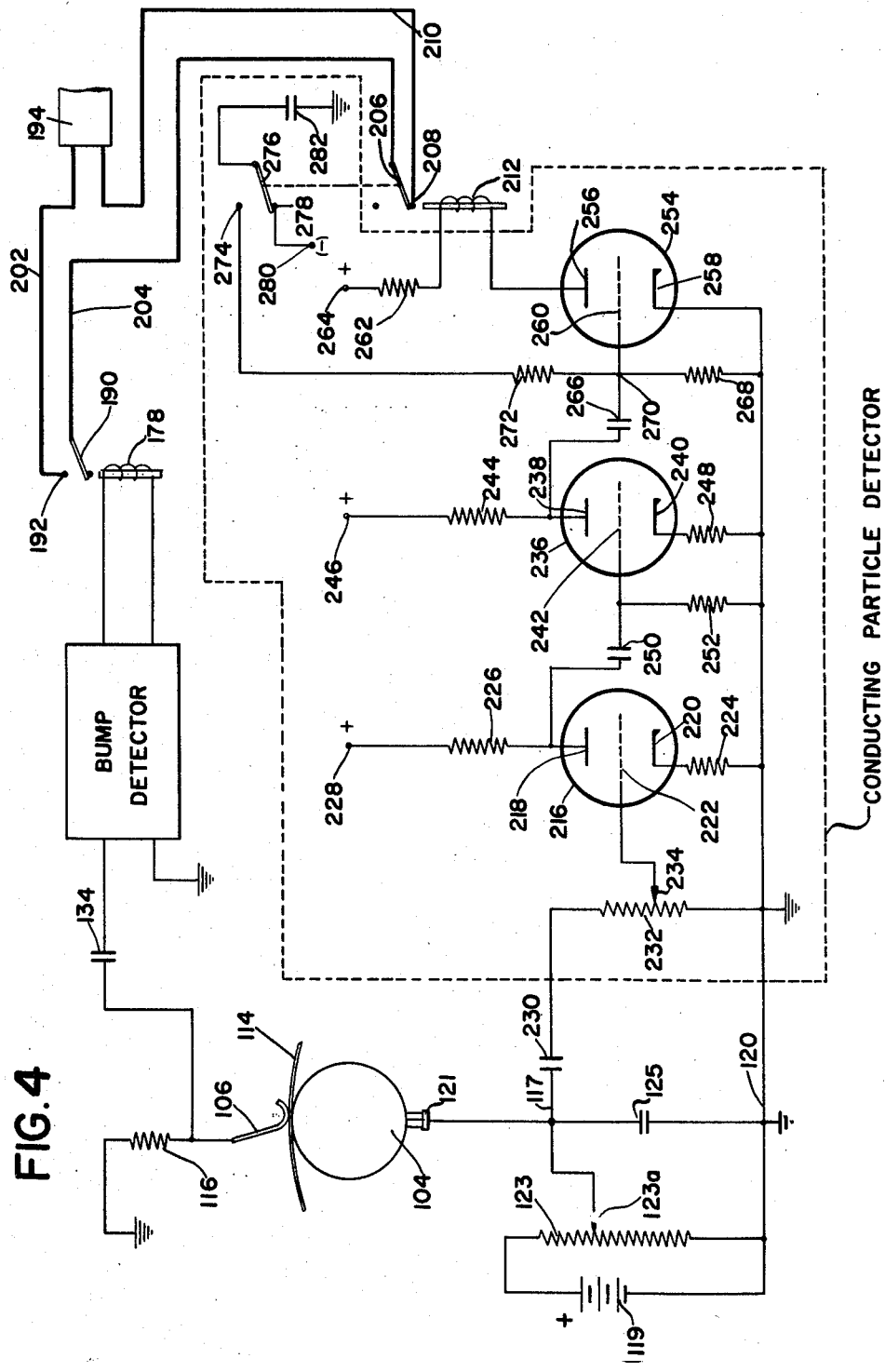
Figure 4 is a schematic circuit diagram of apparatus employing, in combination, a bump detector and a conducting-particle detector, connected so that the conducting particle detector prevents the bump detector from producing spurious signals in response to the occurrence of conducting particles in the advancing dielectric sheet material.

There is shown in Figure 4 dielectric sheet material 114 advancing between a roller electrode 104 and a skid electrode 106. It may be seen that the energizing circuit for these electrodes corresponds to that shown in Figure 1. In Figure 4, various elements corresponding to those shown in Figure 1 are indicated by like reference numerals, except that in Figure 4 the reference numerals are greater than those of Figure 1 by 100. Thus the resistor 116 of Figure 4 corresponds to resistor 16 of Figure 1 etc.

The box labeled "bump detector" in Figure 4 corresponds to the circuit in Figure 1 enclosed in the box defined by broken lines.

In the operation of the circuit in Figure 4, if it were not for the action of the conducting particle detector, the bump detector circuit might, under some circumstances, produce spurious indications, because the passage of conducting particles between the electrodes 104 and 106 might produce such a voltage variation across these electrodes as to cause the winding 178 to release the armature 190 so that it is pulled by its spring up against the contact 192, and this would actuate the alarm or indicator represented by the output means 194, unless means were provided to prevent this action. The conducting particle detector and its associated circuits prevent such spurious actuation of the device 194.

As shown in Figure 4, the device 194 can be actuated only when its series-connected input circuit is complete. This input circuit may be traced from device 194, through the lead 202, the terminal 192, the armature 190, a lead 204, an armature 206, a contact 208, and a lead 210, back to the device 194. If the armature 190 is disengaged from its contact 192, or if the armature 206 is disengaged from its contact 208, the device 194 is not actuated. Only when both the armatures 190 and 206 are in engagement with their associated contacts 192 and 208, respectively, is the device 194 actuated.

The overall operation of the apparatus is such that the armature 206 normally engages its contact 208. If a bump passes between the electrodes 104 and 106, it remains in that condition, and when, in response to the bump, the armature 190 engages the contact 192, this actuates the device 194.

The armature 206, which is spring-biased upwardly, is normally held downwardly against its contact 208, because of heavy current normally passing through its associated winding 212. When a conducting particle occurs, the current through the winding 212 is cut off or diminished sufficiently to allow the spring to pull the armature 206 away from the contact 208. Thus, even though the bump detector may respond to the conducting particle by allowing its armature 190 to engage its contact 192, a slightly prior opening of the input circuit of the means 194 by the armature 206 prevents a spurious response of the system, as desired.

The illustrative conducting particle detector circuit shown in Figure 4 will now be described. There is provided a first amplifier comprising a tube 216 having an anode 218, a cathode 220, and a grid 222. The cathode is connected to ground through a resistor 224. The anode is connected through a resistor 226 to a positive anode supply voltage at a terminal 228.

The voltage across the condenser 125 is applied to the input or grid circuit of the tube 216 through a coupling condenser 230 and a potentiometer 232. One end of the potentiometer 232 is connected to the condenser 230, and the other end is connected to the grounded terminal 120. The slider 234 of the potentiometer is connected to the grid 222, so that an adjustable amount of the voltage appearing across the condenser 125 is applied to the grid. The tube 216 is normally in a conducting condition.

There is also provided a tube 236 having an anode 238, a cathode 240 and a grid 242. The anode is connected through a resistor 244 to an anode voltage supply at a terminal 246. The cathode is connected to ground through a resistor 248. The grid is coupled to the anode 218 of the tube 216 through a coupling condenser 250, and is also connected to ground through a resistor 252. The cathode resistor 248 biases the tube 236 approximately to cut-off. The cathode resistors 224 and 248 may be bypassed by suitable condensers.

There is also provided a tube 254 having an anode 256, a cathode 258, and a grid 260. The anode 256 is connected through the relay winding 212 and a resistor 262 to an anode supply voltage source at a terminal 264. The cathode 258 is connected to the ground. The grid 260 is coupled, by a coupling condenser 266 to the anode 238 of the tube 236. A resistor 268 is connected between ground and a point 270 in the circuit of the grid 260. The point 270 is also connected by a resistor 272 to a terminal 274. The tube 254 is normally in a heavily conducting condition, so that its winding 212 holds the armature 206 down, in engagement with the contact 208.

Normally there is a very small current flowing between the electrodes 104 and 106, as has been explained. When a conducting particle passes between the electrodes, there is an abrupt large increase in this current, because the conducting particle represents a sudden large decrease in the resistance between these electrodes. This current tends to discharge the condenser 125 somewhat.

The circuit configuration and values of the components are therefore such that the appearance of a conducting particle between the electrodes produces a transient voltage variation across the terminals 117 and 120. The leading portion of this voltage variation will be applied to the grid 222 as a voltage pulse in the negative direction. This may be followed by a positive-going pulse, which occurs when the back edge of the conducting particle passes between the electrodes 104 and 106. As will be explained, the conducting particle detector responds to the leading edge of this pulse before the bump detector can be affected by the conducting particle.

On the grid 242 of the tube 236, there will appear, in response to the conducting particle, an amplified voltage variation having an initial positive-going pulse, because of the phase reversal which occurs within the tube 216.

Applied to the grid 260 of the tube 254 is a resulting voltage variation, characterized by an initial negative-going pulse, because of the phase reversal which occurs within the tube 236. This negative pulse cuts off the current in the tube 254, or diminishes it sufficiently to cause the winding 212 to release its armature 206, so that this armature may be pulled upwardly by its spring.

This opens the input circuit of the device 194, thereby preventing the bump detector circuit from producing spurious operation of the device 194, even though the armature 190 may engage its contact 192.

It is desired that this input circuit be kept open long enough to make certain that the armature 206 does not return into engagement with its contact 208 prior to the time when the bump detector recovers and pulls its armature 190 away from its contact 192. To provide this action, there is provided a time-delay circuit, associated with the tube 254 and its relay.

This time-delay circuit includes an armature 276 mechanically coupled to the armature 206, so that they are both down or up at the same time. The armature 276, when in its up position, engages the contact 274. When in its down position, it engages a contact 278, which is contacted to a source of negative voltage at a terminal 280. The armature 276 is permanently connected to one terminal of a condenser 282, the other terminal of which is grounded.

The time-delay circuit operates in the following manner. Normally the current through the tube 254 and the winding 212 holds the armature 206 down, and this holds the associated armature 276 down against the contact 278, thereby completing a charging circuit from the negative terminal 280 through the armature 276 to the condenser 282, so that its upper plate becomes charged negatively.

When a conducting particle passes between the electrodes 104 and 106, this cuts off the current in the tube 254, releasing the armatures 206 and 276, so that the associated spring moves them to their up positions. This connects the negative terminal of the charged condenser 282 to the contact 274, and thereby applies this negative voltage to the grid 260. The grid 260 is thereby maintained sufficiently negative to hold the tube 254 in a cut-off condition until the condenser 282 can discharge through its discharge path including the resistor 272 and 268. The time constant of the discharge path of the condenser 282 is designed to hold the tube 254 in a cut-off condition long enough so that the input circuit for the means 194 is kept open a sufficient time period to enable the bump detector circuit to recover.

That is, when a conducting particle occurs, even though the bump detector circuit allows the armature 190 to engage the contact 192, the conducting particle detector first opens the input circuit for the means 194 quickly enough to prevent a spurious indication or alarm. After the bump detector has recovered and the armature 190 has been pulled away from the contact 192, the discharge of the condenser 282 is completed sufficiently to allow the tube 254 to conduct again, thereby returning the armatures 206 and 276 to their down positions.

In practice, a single detector device 194 may be controlled by a plurality of pump-detector circuit channels, each having its own winding like 178, armature like 190 and associated terminal like 192. Thus, in such an arrangement, all the armatures like 190 and their associated terminals like 192 would be connected in parallel. In series with this parallel combination there would be a single armature 206 and terminal 208, controlled by a single conducting particle detector. If the armature 206 were engaging its contact 208, then the indicator could be operated if any one of the bump detector armatures were released. In such an arrangement, when a conducting particle appeared in the material, the conducting particle detector would open the circuit, thereby preventing operation of the indicator by any of the bump detector channels and armatures. Furthermore, the time delay arrangement in the conducting particle detector would be adapted to maintain the armature 206 released long enough to assure that operation of the indicator was prevented until the conducting particle had passed, and all the bump detector circuits and armatures had recovered and returned to their original condition.

It will now be explained why, in response to a conducting particle, the conducting particle detector operates, in effect, prior to the operation of the bump detector.

It may be observed that operation of the conducting particle detector is effective as soon as its armature 206 moves away from its terminal 208. On the other hand, the bump detector can have an effect on the indicator only after the armature 190 has completed its motion and reached the contact 192. Therefore, even if the armatures 206 and 190 were released simultaneously, by their windings, the finite time required for the armature 190 to travel to the terminal 192 assures that the conducting particle detector would be able to forestall operation of the indicator by the bump detector.

In addition, as has been stated, a conducting particle produces, at the input of the conducting particle detector, a voltage variation the leading portion of which is a negative voltage pulse, and the conducting particle detector quickly responds to this negative pulse by releasing its armature 206.

On the other hand, a conducting particle produces, at the input to the bump detector, a voltage variation the leading portion of which is a positive pulse, because of the sudden increase in current through the resistor 116. This positive pulse is later followed by a negative pulse. The bump detector, from its previous description, however, will be understood to respond only to a negative input pulse, and not to a positive pulse. A negative pulse at the grid 28 is needed to produce a positive pulse at the grid 44 in order to turn the tube 38 on.

The result is that a conducting particle first actuates the conducting particle detector, and only later applies to the bump detector which senses the particle, a pulse of the correct polarity to release its armature 190. This insures against spurious operation of the indicator, as desired.

In the usual case where a plurality of bump detector circuit channels are used, each with its individual resistor like 116, in combination with a single conducting particle detector, as has been described above, the appearance of a conducting particle between the electrodes for a first bump detector tends to produce at the input of the other bump detectors a voltage variation having an initial negative pulse followed by a positive pulse. The reason for this negative pulse is that the increased current drawn from the power supply drops the potential at the point 117. The resistor 116 for the bump detector the skid of which senses the particle, effectively robs the current from the similar resistors of the other bump detectors, producing a negative pulse at their inputs. These other bump detectors, being adapted to be triggered by the negative pulse, would tend to produce a spurious actuation of the indicator, except for the action of the conducting particle detector. Because this spurious actuation would be caused by the leading portion of the voltage variation, this imposes upon the conducting particle detector a stringent requirement for fast operation. In fact, this requirement is even more stringent, for these other bump detectors, than for the bump detector the electrodes of which received the conducting particle. This is true because the latter bump detector is actuated by the trailing part of the voltage variation. The rapid action of the conducting particle detector which prevents spurious actuation of the indicator by those bump detectors which receive the initial negative pulse depends upon the fact that the conducting particle detector is effective as soon as the armature is released, and starts its motion away from its contact—while none of the bump detectors can actuate the indicator until their armatures have completed their motion, after being released. This action has been explained above, and is of particular importance in connection with the bump detectors in the system which do not themselves sense the conducting particle but which are affected by it.

The apparatus is constructed and adjusted so that the conducting particle detector does not release its armature in response to bumps in the sheet material. At the terminals 117 and 120, from which the control signal for the conducting particle is derived, the response to a bump in the sheet material is a slight rise in voltage, followed by a slight fall in voltage. Because of the stabilizing effect of the condenser 125, and because of the relative values of the circuit components, this variation in voltage is of quite small magnitude, across terminals 117 and 120, and it does not cause the conducting particle detector to change the condition of its armature 206.

Aside from the stabilizing effect of the condenser 125, somewhat the same effect is obtained where the D.-C. voltage source for the terminals 17 and 20 is derived from a rectified and filtered A.-C. supply. That is, the voltage at these terminals, being the output terminals of the power supply filter, does not change much in response to a bump in the material.

It may also be noted at this point that, when a bump occurs, the initial portion of the voltage variation at the input terminals of the bump detector, being negative, is in a direction to actuate it. On the other hand, a bump produces at the input terminals of the conducting particle detector an initial variation which, being positive, is in the wrong direction to actuate it. For this reason, in addition to the fact that the variation at the input terminals of the conducting particle detector is very small, the conducting particle detector is unable to forestall the normal and desirable operation of the bump detector in actuating the indicator where a bump occurs.

As previously described, the size bumps to be detected can be controlled by the slider 54. Also, the absolute and relative sensitivities of the bump detector and conducting particle detector circuits can be controlled by the sliders of the potentiometers 36 and 232, respectively.

It will be understood that the arrangement shown in Figure 4 is illustrative of apparatus combining bump detector components and particle detector components to give the desired unitary, over-all action in which bumps are detected but conducting particles are prevented from actuating the indicating device. Other specific forms of this aspect of the invention may, for example, employ, instead of series-connected armatures like 190 and 206, other types of coincidence circuits, which may include vacuum or gas discharge tubes or transistors.

Illustrative values of circuit components when the sheet material is paper, are:

Resistors:
| | | |
|---|---|---|
| 16 and 116 | ohms | 2,200,000 |
| 23 | do | 1,000,000 |
| 32 | do | 270,000 |
| 36 | do | 2,500,000 |
| 50 | do | 330,000 |
| 52 | do | 50,000 |
| 60 | do | 3,900,000 |
| 62 | do | 100,000 |
| 64 | do | 220,000 |
| 82 | do | 68,000 |
| 84 | do | 1,000,000 |
| 123 | do | 1,000,000 |
| 224 | do | 1,000 |
| 226 | do | 470,000 |
| 232 | do | 1,000,000 |
| 244 | do | 470,000 |
| 248 | do | 10,000 |
| 252 | do | 1,000,000 |
| 262 | do | 22,000 |
| 268 | do | 1,000,000 |
| 272 | do | 1,000,000 |

Condensers:
| | | |
|---|---|---|
| 25 | microfarads | 32.00 |
| 34 | do | 0.005 |
| 58 | do | 0.01 |
| 88 | do | 0.10 |
| 86 | do | 0.05 |
| 125 | do | 32.00 |
| 230 | do | 0.10 |
| 250 | do | 0.10 |
| 266 | do | 0.10 |
| 282 | do | 0.05 |

It will be understood that these specific values are illustrative, and in various instances components having other values may be employed, while still retaining the general mode of operation described herein.

In cases were an A.-C. power supply is rectified and filtered in order to derive the D.-C. source 19 and 119, the condensers 25 and 125 serve to minimize the effect of transients caused by surges or other spurious variations in the A.-C. supply. In installations where such variations in the A.-C. supply are small, it is desirable that the condensers 25 and 125 have smaller values of capacitance than those illustrated above.

The conducting particle detector has been described above in combination with the bump detector, and the bump detector has also been described without the conducting particle detector. The conducting particle detector may, in some cases be used, without the bump detector, to detect conducting particles. In this arrangement, the bump detector of Figure 4 would be omitted, along with the condenser 134, the winding 178, and associated leads. The resistor 116 would remain in the circuit. The lead 202 would be connected to the lead 204, the armature 190 being replaced by a short-circuit. The indicator 194 will now be normally actuated, and will be de-energized to show a conducting particle. If desired, the lead 210 may be shifted from the lower contact 208 to the upper contact, and with this arrangement, the indicator 194 will be normally de-energized, and will be actuated to show a conducting particle.

It will be understood that the term "bump" as used herein includes any sudden increase in the thickness of the material, such as creases, folds, particles of foreign matter, "slime spots" and coating lumps.

While an illustrative form of the invention has been disclosed in considerable detail, it will be understood that various changes may be made in the construction and arrangement of the several parts without departing from the general principles and scope of the invention as defined by the appended claims.

I claim:

1. Apparatus for detecting bumps in rapidly advancing dielectric sheet material, comprising a pair of electrodes yieldably pressed together for engaging opposite surfaces of said material continuously as it advances, a source of D.-C. voltage, and a resistor connected in circuit with said electrodes, for applying a D.-C. voltage through said electrodes to said material, whereby there is a normal D.-C. charging current through said electrodes and said advancing dielectric sheet material and bumps in said material abruptly decrease said current and cause voltage pulses in said circuit, an indicator device, means including electrical translating means for controlling said indicator device, and means including a blocking condenser for applying to said last-mentioned means said voltage pulses, said translating device being adapted to actuate said indicator in response to only voltage pulses greater than a threshold value, whereby said apparatus detects only bumps greater than a certain size in said dielectric sheet material and discriminates against the influence on said indicator of slowly changing variations in the thickness of said sheet material between said electrodes.

2. Apparatus as in claim 1 in which said electrical translating means includes an adjustable element for adjusting said threshold value.

3. Apparatus as in claim 1 in which said electrical translating means comprises a biased-off amplifier, including bias-adjusting means for adjusting said threshold value.

4. A bump detector comprising, in combination, a D.-C. voltage source, a resistor, a skid electrode, and a backing electrode, connected in a series circuit, said skid electrode being urged toward said backing electrode for gripping between them an advancing sheet of dielectric material, whereby to apply a D.-C. voltage through said electrodes to said material and to generate voltage pulses in said circuit in response to the passage of bumps in said material between said electrodes, a biased-off amplifier, means for adjusting the bias of said amplifier, an output circuit for said amplifier, a relay in said output circuit, means in said output circuit for shifting said relay to an alarm position when said amplifier is shifted to a conducting condition, coupling means between said electrodes and the input circuit of said amplifier, said coupling means including means responsive to voltage pulses in said series circuit appearing across said electrodes but adapted to discriminate against unvarying D.-C. voltages appearing across said electrodes, whereby bumps greater than a predetermined size in the material passing between said electrodes produce voltage pulses across said electrodes, turn on said amplifier, and thereby actuate said relay to the alarm condition.

5. Apparatus for detecting bumps in advancing dielectric sheet material comprising a backing electrode, means for passing said material over said backing electrode, a supporting member, a plurality of skid electrodes spaced transversely across said material, said skid electrodes comprising resilient strips of metal carried by said supporting member extending generally toward said backing electrode and pressing a convex surface against said material in regions opposed to said backing electrode, means electrically connecting said skid electrodes together, an energizing circuit for said electrodes, including a source of D.-C. voltage and a resistor, for applying a unidirectional charging current through said electrodes and said advancing dielectric sheet material, whereby bumps in said material advancing between said skid electrodes and said backing electrode decrease said current and produce voltage pulses, an indicator device, relay means including vacuum tube amplifier means for controlling said device, and A.-C. coupling means interposed between said electrodes and said amplifier means for applying said voltage pulses to said amplifier means, for actuating said indicator device when bumps in said material pass between one of the said skid electrodes and said backing electrode while discriminating against the effect on said indicator device of slow changes in the thickness of said material reaching said electrodes.

6. Apparatus as in claim 5 including, as a "size control," adjustable biasing means biasing said amplifier means below cut-off by a voltage selected to cause said apparatus to detect only bumps greater than a selected size.

7. A method for detecting bumps in dielectric sheet material, comprising advancing said material, applying a D.-C. voltage to opposite faces of said material at a plurality of points spaced across its width, to generate voltage pulses when bumps in said material pass said points, amplifying only the A.-C. components of said pulses so as to discriminate against the D.-C. voltage across said points, thereby discriminating against the effects of slow changes in the thickness of said material reaching said points, opposing said amplified pulses to a threshold control voltage corresponding to bumps of a selected minimum size to be detected, so as to produce resulting pulses in response to bumps greater than a selected size, and applying said last-mentioned pulses to output means including an indicating device to actuate the same.

8. Apparatus for detecting irregularities in the thickness of advancing dielectric sheet material, comprising a pair of electrodes for engaging said material as it advances, a sensing circuit connected to said electrodes, an output circuit, first circuit means connected to said sensing circuit for actuating said output circuit in response to an abrupt change in thickness of said material, and means connected to said sensing circuit and to said output circuit, responsive to the presence of conducting particles between said electrodes and adapted to prevent spurious actuation of said output circuit by said first circuit means when said conducting particles pass through said electrodes.

9. Apparatus for detecting abrupt caliper changes in advancing dielectric sheet material comprising, in combination, a pair of electrodes yieldably pressed toward one another for engaging opposite surfaces of said material as it advances, a source of D.-C. voltage, and a resistor connected in a series circuit with said electrodes and said voltage source, an indicating device, an input circuit for said indicating device, including at least two control elements, each having an energizing condition and an open condition, said elements being adapted to actuate said device only when both of them are in an energizing condition, a bump detector circuit connected to be responsive to changes in current through said series circuit and adapted to actuate one of said control elements to its energizing condition in response to passage of bumps and conducting particles in said material between said electrodes, and a conducting particle detector circuit selectively responsive to abrupt decreases in voltage derived from said source when conducting particles pass between said electrodes, adapted to shift the other of said control elements to an open condition quickly enough and to maintain it in that condition long enough to prevent spurious actuation of said indicator by said conducting particles.

10. Apparatus for detecting abrupt caliper changes in rapidly advancing dielectric sheet material, comprising a pair of electrodes for engaging opposite surfaces of said material as it advances, a resistor and an impedance device connected in a series circuit with said electrodes, a uni-directional voltage source, means connecting said voltage source across said impedance device, an indicating device, an energizing circuit for said indicating device including a pair of series-connected control elements, circuit means responsive to variations in the voltage across said resistor for actuating one of said control elements to an energizing condition in response to abrupt increases in the caliper of said material and also in response to conducting particles between said electrodes, and circuit means responsive to the voltage across said impedance device for actuating said other control element to an open condition quickly enough to prevent actuation of said device by said conducting particles.

11. Apparatus for detecting abrupt caliper changes in advancing dielectric sheet material, comprising, in combination, a pair of electrodes for engaging opposite surfaces of said material as it advances, a resistor and a condenser connected in a series circuit with said electrodes, a uni-directional voltage source, circuit means including a resistance element for connecting said voltage source across said condenser, an indicating device, a bump detector circuit having its input terminals connected across said resistor, and adapted to actuate said indicating device in response to abrupt decreases in current through said resistor caused by the passage between said electrodes of bumps in said material, and a conducting particle detector having its input terminals connected across said condenser and having an output circuit connected to prevent said bump detector from actuating said indicating device in response to the passage between said electrodes of conducting particles in said material, said conducting particle detector circuit being responsive to large decreases in voltage across said condenser produced by conducting particles but being adapted to maintain its output circuit unchanged in response to small increases in the voltage across said condenser produced by the passage between said electrodes of bumps in said material.

12. A method for detecting abrupt caliper changes in dielectric sheet material, comprising rapidly advancing said material, applying a D.-C. voltage through a series circuit to opposed areas of said material, to generate voltage variations in said circuit in response to variations in said material, deriving from said series circuit a first signal responsive to both abrupt caliper changes and conducting particles in said material, and a second signal responsive to conducting particles but not to abrupt caliper changes in said material, closing a switch element in a control circuit with the aid of said first signal, and opening a switch element in said control circuit in series with said first control element, with the aid of said second signal, to produce a controlled indication responsive to said abrupt caliper changes but not to said conducting particles.

References Cited in the file of this patent

UNITED STATES PATENTS

| | | |
|---|---|---|
| 1,012,379 | Lougden | Dec. 19, 1911 |
| 1,924,087 | Allen | Aug. 29, 1933 |
| 2,146,442 | Price | Feb. 7, 1939 |
| 2,200,863 | Schuck | May 14, 1940 |
| 2,387,496 | Cornelius | Oct. 23, 1945 |
| 2,576,772 | Bernet | Nov. 27, 1951 |
| 2,635,748 | Arlin | Apr. 21, 1953 |
| 2,732,712 | Reed | Jan. 31, 1956 |